United States Patent
Abarr et al.

(10) Patent No.: US 11,486,638 B2
(45) Date of Patent: Nov. 1, 2022

(54) CO2 SEPARATION AND LIQUEFACTION SYSTEM AND METHOD

(71) Applicant: CARBON CAPTURE AMERICA, INC., Arvada, CO (US)

(72) Inventors: Miles L. Abarr, Boulder, CO (US); Scott Raymond Frazier, Morrison, CO (US)

(73) Assignee: CARBON CAPTURE AMERICA, INC., Arvada, CO (US)

(*) Notice: Subject to any disclaimer, the term of this patent is extended or adjusted under 35 U.S.C. 154(b) by 0 days.

(21) Appl. No.: 15/929,245

(22) Filed: Mar. 30, 2020

(65) Prior Publication Data
US 2020/0309451 A1    Oct. 1, 2020

Related U.S. Application Data

(60) Provisional application No. 62/825,947, filed on Mar. 29, 2019.

(51) Int. Cl.
| F25J 3/06 | (2006.01) |
| F25J 3/02 | (2006.01) |

(52) U.S. Cl.
CPC .......... *F25J 3/067* (2013.01); *F25J 3/0266* (2013.01); *F25J 2205/20* (2013.01);
(Continued)

(58) Field of Classification Search
CPC ........ F25J 3/0266; F25J 3/067; F25J 2205/20; F25J 2210/70; F25J 2220/66;
(Continued)

(56) References Cited

U.S. PATENT DOCUMENTS

| 1,920,434 A | 8/1933 | Prescott |
| 2,738,658 A | 3/1956 | Bronson |

(Continued)

FOREIGN PATENT DOCUMENTS

| EP | 1939564 A1 | 7/2008 |
| EP | 2381198 B1 | 3/2017 |

(Continued)

OTHER PUBLICATIONS

Baxter et al., "Cryogenic CO2 Capture as a Cost-Effective CO2 Capture Process," 2009 International Pittsburgh Coal Conference, pp. 1-14, Sustainable Energy Solutions.

(Continued)

*Primary Examiner* — John F Pettitt, III
(74) *Attorney, Agent, or Firm* — Butzel Long

(57) ABSTRACT

A CO2 separation and liquefaction system such as might be used in a carbon capture and sequestration system for a fossil fuel burning power plant is disclosed. The CO2 separation and liquefaction system includes a first cooling stage to cool flue gas with liquid CO2, a compression stage coupled to the first cooling stage to compress the cooled flue gas, a second cooling stage coupled to the compression stage and the first cooling stage to cool the compressed flue gas with a CO2 melt and provide the liquid CO2 to the first cooling stage, and an expansion stage coupled to the second cooling stage to extract solid CO2 from the flue gas that melts in the second cooling stage to provide the liquid CO2.

12 Claims, 6 Drawing Sheets

(52) U.S. Cl.
CPC ........ *F25J 2210/70* (2013.01); *F25J 2220/66* (2013.01); *F25J 2230/02* (2013.01); *F25J 2230/04* (2013.01); *F25J 2230/30* (2013.01); *F25J 2240/40* (2013.01); *F25J 2260/80* (2013.01); *F25J 2270/80* (2013.01)

(58) Field of Classification Search
CPC ........ F25J 2230/02; F23J 15/06; Y02E 20/16; Y02E 20/18; Y02C 20/40
USPC .......................................................... 62/617
See application file for complete search history.

(56) References Cited

U.S. PATENT DOCUMENTS

| | | | |
|---|---|---|---|
| 3,724,225 | A | 4/1973 | Mancini et al. |
| 4,265,088 | A | 5/1981 | Funk |
| 4,281,518 | A | 8/1981 | Muller et al. |
| 4,923,493 | A | 5/1990 | Valencia et al. |
| 5,568,737 | A * | 10/1996 | Campbell ............... F25J 3/0242 62/621 |
| 5,819,555 | A | 10/1998 | Engdahl |
| 6,082,133 | A | 7/2000 | Barclay et al. |
| 7,073,348 | B2 | 7/2006 | Clodic et al. |
| 7,493,779 | B2 | 2/2009 | Amin |
| 7,985,278 | B2 | 7/2011 | Guidati et al. |
| 8,163,070 | B2 | 4/2012 | Hees et al. |
| 8,511,113 | B2 | 8/2013 | Assink et al. |
| 8,585,802 | B2 | 11/2013 | Keller |
| 8,617,292 | B2 | 12/2013 | Hasse et al. |
| 8,764,885 | B2 | 7/2014 | Baxter et al. |
| 8,771,401 | B2 | 7/2014 | VanOsdol |
| 9,103,584 | B2 | 8/2015 | Keller |
| 9,283,502 | B2 | 3/2016 | Balepin et al. |
| 9,339,752 | B2 | 5/2016 | Reddy et al. |
| 9,423,174 | B2 | 8/2016 | Northrop et al. |
| 9,776,132 | B2 | 10/2017 | Enis et al. |
| 10,393,432 | B2 | 8/2019 | Reddy et al. |
| 2006/0277942 | A1 | 12/2006 | Clodic et al. |
| 2007/0277674 | A1 | 12/2007 | Hirano et al. |
| 2008/0302133 | A1 | 12/2008 | Saysset et al. |
| 2009/0013868 | A1 | 1/2009 | Darde et al. |
| 2009/0113932 | A1 | 5/2009 | Amin |
| 2010/0024471 | A1 * | 2/2010 | Hees ........................ F25J 3/066 62/532 |
| 2010/0024476 | A1 * | 2/2010 | Shah ..................... B01D 53/002 62/617 |
| 2011/0023537 | A1 | 2/2011 | Assink et al. |
| 2011/0056373 | A1 | 3/2011 | Baxter |
| 2011/0061385 | A1 | 3/2011 | Baxter |
| 2011/0226010 | A1 | 9/2011 | Baxter |
| 2011/0252827 | A1 | 10/2011 | Lockwood et al. |
| 2011/0296868 | A1 | 12/2011 | Lockwood et al. |
| 2011/0302955 | A1 | 12/2011 | Lockwood et al. |
| 2012/0079852 | A1 | 4/2012 | Northrop et al. |
| 2012/0125043 | A1 | 5/2012 | Cullinane et al. |
| 2012/0132072 | A1 | 5/2012 | Baxter |
| 2012/0180657 | A1 | 7/2012 | Monereau et al. |
| 2012/0204599 | A1 | 8/2012 | Northrop et al. |
| 2012/0297821 | A1 | 11/2012 | Baxter et al. |
| 2013/0025294 | A1 | 1/2013 | Vogel et al. |
| 2013/0025317 | A1 | 1/2013 | Terrien et al. |
| 2013/0056170 | A1 | 3/2013 | Klemencic |
| 2013/0104595 | A1 | 5/2013 | Zia |
| 2013/0139543 | A1 | 6/2013 | Baxter |
| 2014/0144178 | A1 | 5/2014 | Terrien et al. |
| 2015/0000333 | A1 | 1/2015 | Zia et al. |
| 2015/0168054 | A1 | 6/2015 | Davidian et al. |
| 2015/0253076 | A1 | 9/2015 | Briglia et al. |
| 2016/0290714 | A1 | 10/2016 | Baxter et al. |
| 2016/0327333 | A1 * | 11/2016 | Chambron ............. F25J 1/0294 |
| 2016/0327337 | A1 | 11/2016 | Reddy et al. |
| 2017/0368499 | A1 * | 12/2017 | Hofer ................... B01D 53/226 |
| 2018/0031315 | A1 * | 2/2018 | Baxter ................... F01D 15/005 |

FOREIGN PATENT DOCUMENTS

| | | |
|---|---|---|
| WO | 2016138156 A1 | 9/2016 |
| WO | 2016179115 A1 | 11/2016 |

OTHER PUBLICATIONS

Jensen et al., "Prediction and Validation of External Cooling Loop Cryogenic Carbon Capture (CCC-ECL) for Full-Scale Coal-Fired Power Plant Retrofit," International Journal of Greenhouse Gas Control, vol. 42, Nov. 2015, pp. 200-212.

Nielson, "Cryogenic Carbon Capture using a Desublimating Spray Tower," Brigham Young University, BYU ScholarsArchive, Theses and Dissertations, Jul. 5, 2013, pp. i-106.

James, "Failing Drop CO2 Deposition (Desublimation) Heat Exchanger for the Cryogenic Carbon Capture," Brigham Young University, BYU ScholarsArchive, Theses and Dissertations, Jun. 14, 2011, pp. 1-81.

Jensen, "Energy Process Enabled by Cryogenic Carbon Capture," Brigham Young University, BYU ScholarsArchive, Theses and Dissertations, Feb. 1, 2015, pp. i-171.

Fazlollahi et al., "Effect of Operating Conditions on Cryogenic Carbon Dioxide Removal," Energy Techology, vol. 5, No. 9, pp. 1588-1598,2017 Wiley-VCH Verlag GmbH & Co. kGaA, Weinheim.

Baxter et al., "Cryogenic Carbon Capture Development," Project Kick-Off Meeting, NETL Pittsburgh, Dec. 9, 2016, pp. 1-70, Sustainable Energy Solutions.

Baxter et al., "Cryogenic Carbon Capture," CO2 Summit II: Technologies and Opportunities Proceedings, Nov. 4, 2016, pp. 1-32, Engineering Conferences International, ECI Digital Archives.

Sayre et al., "Field Testing of Cryogenic Carbon Capture," Carbon Management Technology Conference, 2017, pp. 1-11.

Baxter, "Cryogenic Carbon Capture Development Progress and Field Test Data," Aug. 26, 2019, pp. 1-31, Sustainable Energy Solutions.

Baxter et al., "Cryogenic Carbon Capture Development," 2018 NETL CO2 Capture Conference, Aug. 13-17, 2018, pp. 1-30, Sustainable Energy Solutions.

Burt et al., "Cryogenic CO2 Capture to Control Climate Change Emissions," Jun. 2009, ResearchGate, pp. 1-14.

Tuinier et al., "Cryogenic CO2 Capture using Dynamically Operated Packed Beds," Chemical Engineering Science, vol. 5, No. 1, 2010, pp. 114-119, Elsevier Ltd.

Tuinier, "Novel Process Concept for Cryogenic CO2 Capture," University of Technology Eindhoven, Jan. 1, 2011, pp. i-168.

Tuinier et al., "Techno Economic Evaluation of Cryogenic CO2 Capture—A Comparison with Absorption and Membrane Technology," International Journal of Greenhouse Gas Control, vol. 5, No. 6, 2011, pp. 1559-1565, Elsevier Ltd.

Berger et al., "Thermodynamic Analysis of Post-Combustion Inertial CO2 Extraction System," ScienceDirect, Energy Procedia, vol. 114, 2017, pp. 7-16, Elservier Ltd.

Sipocz et al., "Low Temperature CO2 Capture for Near-term Applications," SciVerse ScienceDirect, Energy Procedia, vol. 37, 2013, pp. 1228-1238, Elsevier Ltd.

Clodic et al.,"CO2 Capture by Anti-Sublimation Thermo-Economic Process Evaluation," 4th Annual Conference on Carbon Capture & Sequestration, May 2-5, 2005, Alexandria, VA, pp. 1-11.

Clodic et al.,"Test Results of CO2 Capture by Anti-Sublimation Capture Efficiency and Energy Consumption for Boiler Plants," Greenhouse Gas Control Technologies 7, vol. II, Part 2, 2005, pp. 1775-1780.

Feng et al., "Evaluation of Stirling Cooler System for Cryogenic CO2 Capture," Applied Energy, vol. 98, Nov. 2012, pp. 491-501, Elsevier Ltd.

Song et al., "Application of Free Piston Stirling Cooler (SC) on CO2 Capture Process," SciVerse ScienceDirect, Energy Procedia, vol. 37, 2013, pp. 1239-1245, Elsevier Ltd.

Yang et al., "Analysis of a New Liquefaction Combined with Desublimation System for CO2 Separation Based on N2-CO2 Phase Equilibrium," Energies, vol. 8, No. 9, Sep. 1, 2015, pp. 9495-9508.

(56) References Cited

OTHER PUBLICATIONS

Yuan et al., "A Preliminary Investigation of Cryogenic CO2 Capture Utilizing a Reverse Brayton Cycle," AIP Conference Proceedings, Advances in Cryogenic Engineering, vol. 1573, 2014, pp. 1107-1114, AIP Publishing LLC.

Belaissaoui et al., "Hybrid Membrane Cryogenic Process for Post-Combustion CO2 Capture," SciVerse Science Direct, Procedia Engineering, vol. 44, Euromembrane Conference 2012, pp. 417-422, Elsevier Ltd.

Xu et al., "An Improved CO2 Separation and Purification System Based on Cryogenic Separation and Distillation Theory," Energies, vol. 7, No. 5, May 23, 2014, pp. 3484-3502.

Swanson et al., "Thermodynamic Analysis of Low-Temperature Carbon Dioxide and Sulfur Dioxide Capture from Coal-Burning Power Plants," Physical Review E 86, 2012 American Physical Society, pp. 016103-1-016103-9.

Nachtmann et al, "Efficient Storage and Mobile Use of Biogas as a Liquid Biomethane," Landtechnik Agricultural Engineering, vol. 72, No. 4, Aug. 2017, pp. 179-201, ResearchGate.

Yu et al., "Numerical Modeling and Analytical Modeling of Cryogenic Carbon Capture in a De-Sublimating Heat Exchanger," CEC 2017, IOP Conf. Series: Materials Science and Engineering, vol. 278, pp. 1-8, IOP Publishing.

Tan et al., "Cryogenic Technology for Biogas Upgrading Combined with Carbon Capture—A Review of Systems and Property Impacts," 9th International Conference on Applied Energy, ICAE2017, Aug. 21-24, 2017, Cardiff, UK, ScienceDirect, Energy Procedia, vol. 142, pp. 3741-3746, Elsevier Ltd.

Naletov et al., "Mathematical Modeling of Desublimation of Carbon Dioxide from Flue Gases of Heat Power Systems," Theoretical Foundations of Chemical Engineering, vol. 48, No. 1, 2014, pp. 27-33, Pleiades Publishing, Ltd.

Chun-Feng et al., "Analysis of CO2 Frost Formation Properties in Cryogenic Capture Process," International Journal of Greenhouse Gas Control, vol. 13, 2013, pp. 26-33, Elsevier Ltd.

Zanganeh et al., "CO2 Capture and Development of an Advanced Pilot-Scale Cryogenic Separation and Compression Unit," ScienceDirect, Energy Procedia, vol. 1, 2009, pp. 247-252, Elsevier Ltd.

Hart et al., "Cryogenic CO2 Capture in Natural Gas," ScienceDirect, Energy Procedia, vol. 1, 2009, pp. 697-706, Elsevier Ltd.

George et al., "Fundamental and Applied Numerical Approaches for CO2 Capture in Flue Gases within a Supersonic Nozzle," International Gas Union Research Conference, Sep. 17-19, 2014, pp. 1-10, International Gas Union.

Northrop et al., "The CFZ™ Process: A Cryogenic Method for Handling High-CO2 and H2S Gas Reserves and Facilitating Geosequestration of CO2 and Acid Gases," ScienceDirect, Energy Procedia, vol. 1, 2009, pp. 171-177, Elsevier Ltd.

Maqsood et al., "Performance Enhancement and Energy Reduction Using Hybrid Cryogenic Distillation Networks for Purification of Natural Gas with High CO2 Content," Korean Journal of Chemical Engineering, vol. 31, No. 7, 2014, pp. 1120-1135.

Maqsood et al., "Synthesis of Conventional and Hybrid Cryogenic Distillation Sequence for Purification of Natural Gas," Journal of Applied Sciences, vol. 14, No. 21, 2014, pp. 2722-2729.

Schach et al., "Feasibility Study of CO2 Capture by Anti-Sublimation," ScienceDirect, Energy Procedia, vol. 4, 2011, pp. 1403-1410, Elsevier Ltd.

Berstad et al., "Low-Temperature Syngas Separation and CO2 Capture for Enhanced Efficiency of IGCC Power Plants," ScienceDirect, Energy Procedia, vol. 4, 2011, pp. 1260-1267, Elsevier Ltd.

Berstad et al., "Low-Temperature CO2 Removal from Natural Gas," SciVerse ScienceDirect, Energy Procedia, vol. 26, 2012, pp. 41-48, Elsevier Ltd.

Dutcher et al., "Amine-Based CO2 Capture Technology Development from the Beginning of 2013—A Review," ACS Applied Materials & Interfaces, vol. 7, 2015, pp. 2137-2148, ACS Publications.

Kanniche et al., "CO2 Capture Study in Advanced Integrated Gasification Combined Cycle," ScienceDirect, Applied Thermal Engineering, vol. 27, 2007, pp. 2693-2702, Elsevier Ltd.

Khalilpour et al., "HEN Optimization for Efficient Retrofitting of Coal-Fired Power Plants with Post-Combustion Carbon Capture," International Journal of Greenhouse Gas Control, vol. 5, No. 2, 2011, pp. 189-199, Elsevier Ltd.

Lee et al., "A Review on Solid Adsorbents for Carbon Dioxide Capture," Journal of Industrial and Engineering Chemistry, vol. 23, 2015, pp. 1-11, Elsevier Ltd.

Mumford et al., "Review of Solvent Based Carbon-Dioxide Capture Technologies," Front. Chem. Sci. Eng., vol. 9, No. 2, 2015, pp. 125-141.

Seipp et al., "CO2 Capture from Ambient Air by Crystallization with a Guanidine Sorbent," Wiley Online Library, Dec. 21, 2016, pp. 1-13, Wiley-VCH Veriag GmbH & Co. KGaA, Weinheim.

Chinese Office Action issued in App. No. CN202080024303, dated Aug. 23, 2022, 9 pages.

\* cited by examiner

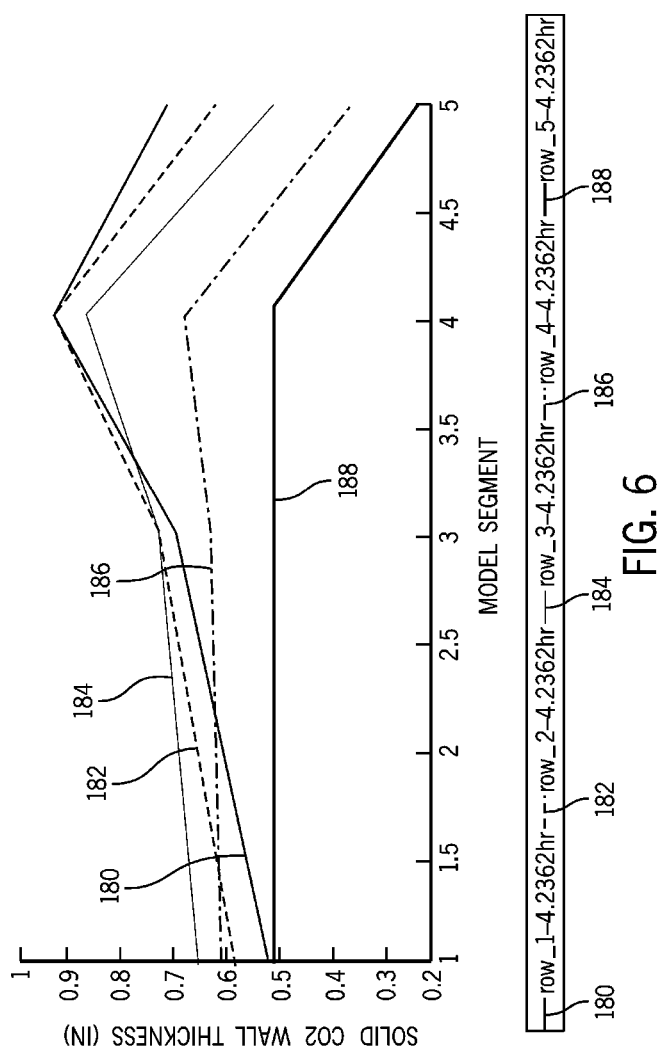

US 11,486,638 B2

CO2 SEPARATION AND LIQUEFACTION SYSTEM AND METHOD

CROSS-REFERENCE TO RELATED APPLICATION

The present invention is a non-provisional of and claims priority to U.S. Provisional Patent Application Ser. No. 62/825,947, filed Mar. 29, 2019, the disclosure of which is incorporated herein by reference in its entirety.

BACKGROUND OF THE INVENTION

Embodiments of the invention are directed to CO2 separation & liquefaction, and more particularly, to CO2 capture technology that uses exhaust gas as a refrigerant to liquefy and separate CO2 from the exhaust gas.

Global climate change, or global warming, is generally considered by the scientific community to be a result of CO2 emissions originating from human activity. A primary source of CO2 emissions is the combustion of fossil fuels for energy production. To slow the increase of global temperatures, society must decrease the amount of CO2 emitted to the atmosphere as our demand for energy increases. One method of reducing CO2 emissions is to capture CO2 generated as a byproduct of combustion at fossil fuel burning power plants. Carbon capture and sequestration (CC S) technologies remove CO2 from power plant emissions, called flue gas, often as liquid CO2 to be pumped and stored underground to prevent increase in CO2 emissions to the atmosphere. Technologies to improve carbon capture are heavily researched, including technologies that retrofit existing power plants with CCS systems. For instance, the FLExible Carbon Capture and Storage (FLECCS) program is a government initiative that funds development of carbon capture and storage (CCS) technologies that enable power generators to improve response to grid conditions in a high variable renewable energy (VRE) penetration environment. Lower capital cost carbon capture technology is of significant interest for FLECCS.

Unfortunately, existing carbon capture and sequestration (CCS) systems typically have high capital costs. Typical CCS systems include conventional amine carbon capture technology and cryogenic carbon capture with external cooling or refrigeration systems. Reversible reactions between amines and CO2 make amines suitable for separating CO2 from post combustion exhaust, including flue gas. Conventional amine carbon capture technologies tend to have high capital costs, at the rate of 4 or more times that of some cryogenic systems. Further, amine CCS technologies may not meet the FLECCS objectives without additional retrofits, like thermal energy storage (TES), to the power plant.

Other CCS systems also include cryogenic carbon capture systems that use external cooling or refrigeration cycles. Externally cooled cryogenic carbon capture uses refrigeration systems to cool pressurized exhaust or flue gas. Using external refrigeration systems allows for the design of smaller temperature differences within the heat exchange processes, which can lead to higher efficiency. Unfortunately, the higher efficiency comes at the price of higher capital cost, primarily from bigger heat exchangers. Additionally, external cooling systems require specialized refrigerants and multiple heat pump subsystems, which increases system complexity, operation challenges, and drives up costs. Further, externally cooled cryogenic carbon capture usually requires use of a refrigerant with high global warming potential. For example, a typical refrigerant for such processes is R-14 (tetrafluoromethane), which has a 100-year global warming potential (GWP) estimated at over 6,500. This means that very small leaks in the R-14 refrigerant loop could significantly reduce the impact of the CO2 that is captured by the system.

Therefore, it would be desirable to having a CCS system that minimizes capital costs by using modular construction to retrofit existing fossil fuel burning power plants. It would further be desirable to have a CCS system that uses low-cost heat exchangers that operate with relatively large temperature differences as compared to prior cryogenic systems, and which can also accommodate solid ice and solid CO2 formation if operated at low temperatures. A carbon capture process that uses no chemicals or refrigerants other than the exhaust gas itself would reduce environmental footprint, operation, and maintenance costs.

BRIEF DESCRIPTION OF THE INVENTION

In accordance with one aspect of the invention, a CO2 separation and liquefaction system includes a first cooling stage to cool flue gas with liquid CO2, a compression stage coupled to the first cooling stage to compress the cooled flue gas, a second cooling stage coupled to the compression stage and the first cooling stage to cool the compressed flue gas with a CO2 melt and provide the liquid CO2 to the first cooling stage, and an expansion stage coupled to the second cooling stage to extract solid CO2 from the flue gas that melts in the second cooling stage to provide the liquid CO2.

In accordance with another aspect of the invention, a CCS system includes a first cooling stage to cool a flue gas with CO2 to be sequestered, a compression stage coupled to the first cooling stage to compress the cooled flue gas, a second cooling stage coupled to the compression stage to cool the compressed flue gas with solid CO2, and an expander coupled to the second cooling stage to extract solid CO2 from the flue gas, the expander coupled to the first cooling stage and the second cooling stage to provide the solid CO2 and the CO2 to be sequestered.

In accordance with yet another aspect of the invention, a method of operating a CO2 liquefaction system includes extracting flue gas from a flue gas producer, compressing the flue gas in a first compressor, cooling the flue gas in a heat exchanger cooled by the ambient environment, cooling a first stream of the flue gas from the heat exchanger using liquid CO2, compressing the flue gas in a second compressor, cooling the flue gas by melting solid CO2 and producing the liquid CO2, and expanding the flue gas to extract the solid CO2.

In accordance with still another aspect of the invention, a CCS system for a power plant includes a first compressor to compress air and a first heat exchanger coupled to the first compressor to cool the compressed air, the first heat exchanger cooled by an ambient environment. The CCS system also includes a first cooling stage coupled to the power plant to receive flue gas and coupled to the first heat exchanger to receive the air, the first cooling stage cooling the flue gas and the air with liquid CO2. The CCS system further includes a second compressor coupled to the first cooling stage to receive and compress the air, a second cooling stage coupled to the second compressor to receive and cool the air, the second cooling stage coupled to the first cooling stage to cool and extract CO2 from the flue gas and provide the liquid CO2, and an expansion stage coupled to the second cooling stage to expand the air and provide the expanded air to the second cooling stage to cool the flue gas.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings:

FIG. 6 is a graph of CO2 building up on the walls of heat exchangers used in a CO2 separation and liquefaction system, according to an embodiment of the invention.

DETAILED DESCRIPTION OF THE PREFERRED EMBODIMENT

The operating environment of the invention is described with respect to a CO2 separation and liquefaction system for use with exhaust gases from fossil fuel combustion. However, those skilled in the art will appreciate that the invention is equally applicable for separating and liquifying CO2 from other carbon gas streams. While embodiments of the invention will be described with respect to a carbon capture and sequestration system for a fossil fuel burning power plant, embodiments of the invention are equally applicable for use with CO2 separation and liquefaction for other industrial processes.

Figure 1:
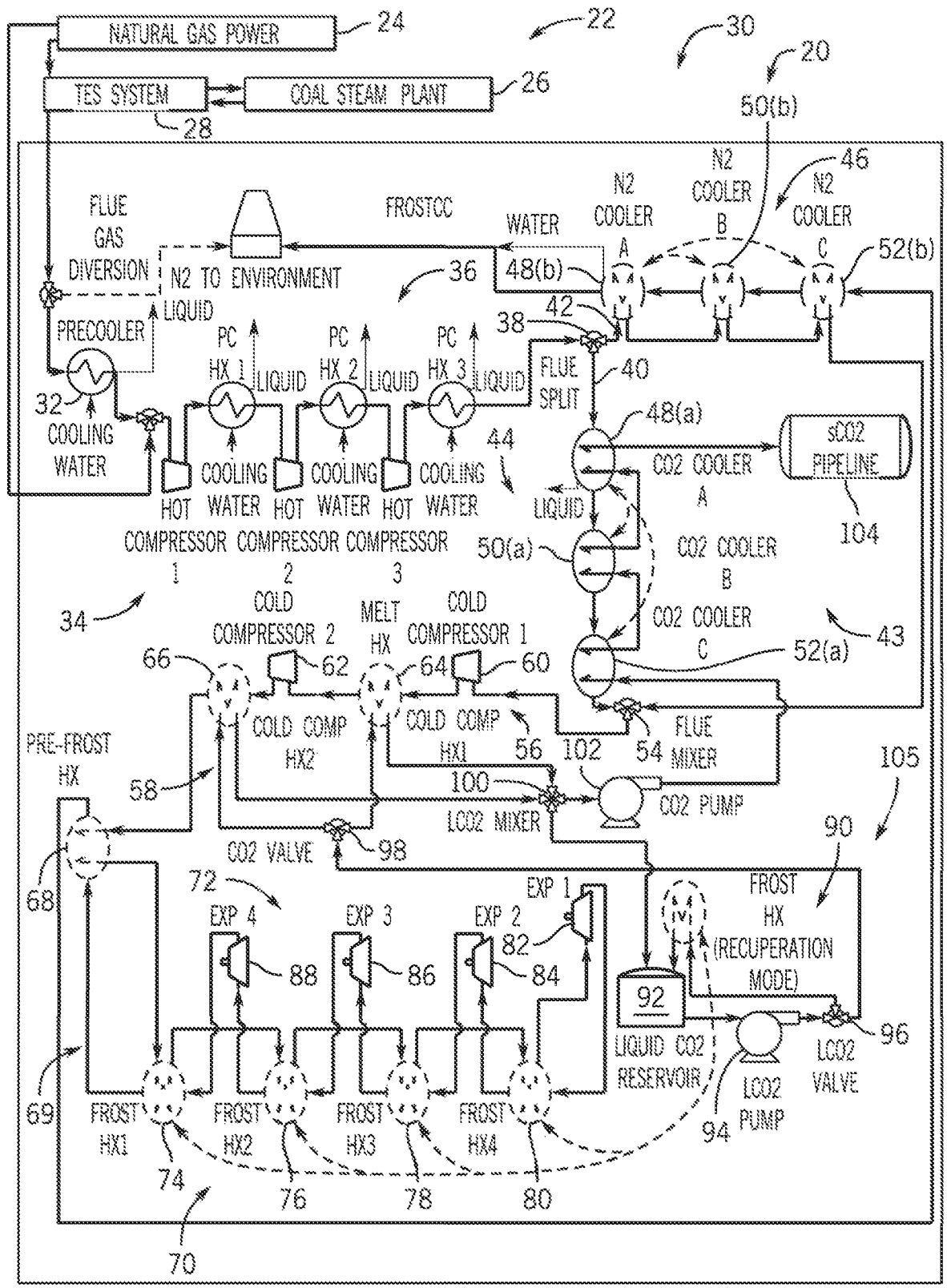
FIG. 1 is process diagram of a CO2 separation and liquefaction system with interwarming expansion coupled to a combined cycle power plant and a thermal energy storage system, according to an embodiment of the invention.

Referring to FIG. 1, a CO2 separation and liquefaction system 20 with interwarming expansion is shown, in accordance with an embodiment of the invention. The CO2 separation and liquefaction system 20 is shown coupled to a combined-cycle power plant 22 which includes a natural gas power plant 24, coal steam plant 26, and a thermal energy storage (TES) system 28. The natural gas power plant 24 burns fossils fuels (e.g. natural gas) to generate electrical power and can reject heat through its exhaust, or flue gas, to the TES system 28. The TES system 28 couples to the coal steam plant 26 to preheat water used in the steam plant. The coal steam plant 26 burns fossil fuels (e.g. coal) to generate electrical power and can reject heat through its flue gas to the TES system 28.

Thermal energy storage systems, such as TES system 28, may consist of a wide range of storage technologies that allow excess thermal energy from industrial processes to be stored for later use. Thermal energy storage may be used for balancing energy demands between daytime and nighttime or other periods of high variable energy demand. For example, U.S. patent application Ser. No. 14/919,535 filed Oct. 21, 2015 and issued as U.S. Pat. No. 10,054,373 on Aug. 21, 2018, the disclosure of which is incorporated herein by reference in its entirety, discloses a thermal heat capture, storage, and exchange arrangement. The arrangement includes at least one thermal exchange and storage (TXES) array that receives a fluid flow of a heat source fluid, and at least one heat engine operable with the TXES array that extracts heat from the TXES array and converts it to mechanical energy.

In a preferred embodiment, the CO2 separation and liquefaction system 20 may receive flue gas from the natural gas power plant 24 and/or the coal steam plant 26, either directly or indirectly via the TES system 28. The CO2 separation and liquefaction system 20 can utilize the flue gas as an auto-refrigerant by compressing, cooling, and then expanding the flue gas to further reduce its temperature so that CO2 from the flue gas will frost (e.g., change phase from a gas to a solid). With the CO2 in solid phase, it can then be separated from the rest of the flue gas, converted to a liquid or superheated state, and directed underground for sequestration. Thus, the CO2 separation and liquefaction system 20 may provide a cryogenic carbon capture and sequestration (CCS) system 30 for the combined-cycle power plant 22.

A key benefit of the CCS system 30 is that it is relatively simple, and therefore very low capital cost, while remaining competitively efficient with other carbon sequestration systems. Compared to other cryogenic carbon capture and sequestration systems, which invoke highly complex refrigeration systems, the CCS system 30 can use the flue gas as the only refrigerant. The simplicity of this approach provides the potential for a very low capital cost CCS system while achieving acceptable efficiency.

FIG. 1 shows the CCS system 30 first cooling the flue gas received from the TES system 28 in a precooler 32 to condense out water and acid, and to minimize future compression work. At this point, if the natural gas power plant 24 is in use, some flue gas may be recycled back to the natural gas power plant 24. Flue gas that is not recycled may then be directed to one or more compressors 34, generally referred to as hot compressor(s) if compressing hot flue gas. At this stage, the flue gas can behave as an air-like gas and thus undergoes vapor compression in the hot compressor(s). The flue gas is further cooled in one or more post-compression heat exchangers 36 following compression in each of the one or more compressors 34. Each of the post-compression heat exchanger(s) 36 is preferably cooled by the ambient environment, and more water/acid is removed. In one embodiment, the post-compression heat exchanger(s) 36 may be cooled by water from the ambient environment. FIG. 1 shows the flue gas being compressed and cooled in three stages of hot compressors 34 and post-compression heat exchangers 36.

Next, the flue gas preferably enters a flue split 38 which separates the flue gas into a first stream 40 and a second stream 42 and directs each stream to a first cooling stage 43 comprising two parallel recuperative cooling processes. The first stream 40 of flue gas is cooled using liquid and/or supercritical CO2 by a first plurality of series connected heat exchangers 44. The second stream 42 of flue gas is cooled using N2 by a second plurality of series connected heat exchangers 46. As will be described in more detail below, the first stream 40 of flue gas may be cooled using CO2 extracted from the flue gas before the CO2 is sequestered. The second stream 42 of flue gas may be cooled using N2 from the flue gas after the CO2 is extracted. That is, the second stream 42 of flue gas may be cooled using ambient (or near ambient) pressure, nitrogen-rich flue gas before it exits to the atmosphere. Thus, the first stream 40 recuperates cooling potential from the extracted CO2, and the second stream 42 recuperates cooling potential from the nitrogen-rich flue gas.

The first plurality of series connected heat exchangers 44 and the second plurality of series connected heat exchangers 46 (i.e., the CO2 and N2 coolers) each preferably include three identical sets of heat exchangers in series, though each could have 2, 4, or any suitable number of heat exchangers. The first heat exchanger 48(*a*), 48(*b*) in each series preferably cools the flue gas to a temperature just above the freezing point of water, which allows further water removal from the flue gas. The second heat exchanger 50(*a*), 50(*b*) in each series preferably cools the flue gas to temperatures where water begins freezing on the walls of the heat exchangers. The third heat exchanger 52(*a*), 52(*b*) in each series preferably further cools the flue gas to remove additional water and ice from the flue gas (e.g., to near 220K in some embodiments). Additional ice should build up on each of the third heat exchangers 52(*a*), 52(*b*), though at a slower rate than in the second heat exchangers 50(*a*), 50(*b*) since the flue gas contains less water.

It is recognized that the ice build-up in the first plurality of series connected heat exchangers 44 and the second plurality of series connected heat exchangers 46 should be removed periodically to prevent clogging and poor heat transfer performance therein. To remove the ice-buildup, the first plurality of series connected heat exchangers 44 and the second plurality of series connected heat exchangers 46 may be swapped within each respective series on a regular basis such that the heat exchangers with ice build-up can exchange heat with the CO2 or nitrogen rich flue streams above the freezing point of water, and thus force the ice to melt off. Swapping the first plurality of series connected heat exchangers 44 and the second plurality of series connected heat exchangers 46 allows the heat exchangers previously operating below the freezing point of water to be regenerated, with water, SOx, and other condensates drained therefrom. There may still be water in the flue gas after the heat exchangers in 44 and 46, so this equipment may require an infrequent regeneration step of bringing those units up to a temperature above the triple point of water to melt off ice build-up. Another method to handle the water ice build-up would be to install a dehydration system before the flue gas temperature gets below the triple point of water, which could alleviate the need for these heat exchanger regeneration processes.

Swapping the first plurality of series connected heat exchangers 44 and the second plurality of series connected heat exchangers 46 may include reordering/rearranging the heat exchangers in their respective series by moving one or more heat exchangers operating along a colder portion of the flue gas (e.g. CO2 stream and nitrogen rich flue stream) to a warmer portion, and vice versa, rather than by replacing an iced-up heat exchanger so that it can thaw once removed from the series. By contrast, traditional methods of deicing heat exchangers can require turning them off, swapping one out of a cooling operation to thaw or adding heat in some form to melt the ice buildup. Embodiments of the present invention provide energy benefits over other systems by reducing costs associated with heat addition or removing heat exchangers from a cooling operation. Further, the current invention may include control valving (not shown) that includes controllers timed to swap series heat exchangers when efficiencies start to fall, which can optimize the performance of the series.

As shown in FIG. 1, the first stream 40 and the second stream 42 of flue gas enter a flue mixer 54 which combines the streams for entry into a compression stage 56 and a second cooling stage 58. The compression stage 56 may include a first compressor 60 and a second compressor 62 in series to compress the flue gas from the first cooling stage 43. The second cooling stage 58 may include a first heat exchanger 64 in series between the first compressor 60 and second compressor 62, and a second heat exchanger 66 downstream from the second compressor 62. The first compressor 60 and the second compressor 62 may be referred to as cold compressors since they are located downstream from the first cooling stage 43. The first compressor 60 and the second compressor 62 may perform vapor compression of the flue gas existing in an air-like state.

The first stream 40 and the second stream 42 of flue gas may leave the third heat exchangers 52(*a*), 52(*b*), at a temperature below the freezing point of water (e.g., at around 220K in some embodiments) and be mixed together before being compressed by the first compressor 60 (e.g., to approximately 8.4 bar with the flue gas containing about 15% CO2 by volume in some embodiments). The flue gas may then enter the first heat exchanger 64, where it is preferably cooled by high mass flow liquid CO2 near the melting point of CO2. The flue gas may then be compressed by the second compressor 62 (e.g. to approximately 12.2 bar in some embodiments). The flue gas may then enter the second heat exchanger 66 where it is again cooled by high mass flow liquid CO2 near the melting point of CO2. In some embodiments, CO2 melts/freezes at a temperature within a range of approximately 216-217 K at the pressures of the flue gas following compression by the first compressor 60 and the second compressor 62, therefore first heat exchanger 64 and/or the second heat exchanger 66 preferably cools the flue gas to a temperature just above the freezing point of CO2 or within a range of approximately 218-235K.

The cooling potential for the first heat exchanger 64 and the second heat exchanger 66 comes from the melting energy of the solid CO2 extracted from the flue gas (discussed below). The first compressor 60 and the second compressor 62 of the second cooling stage 58 provide significant efficiency improvements over prior cryogenic CCS systems. The first compressor 60 and the second compressor 62 allow the CO2 separation and liquefaction system 20 to recuperate melting energy of the solid CO2 near the melting point (e.g., near 220K in some embodiments) while using flue gas as the only refrigerant. In contrast, other cryogenic concepts require an external refrigeration system which adds significant complexity and cost. An external refrigeration cycle also requires additional energy to run the cycle, the costs of which can be avoided using embodiments of the current invention.

After leaving the second cooling stage 58, the flue gas can enter a pre-frost heat exchanger 68 which cools the flue gas to a temperature just above where CO2 begins to frost (desublimate). Next, the flue gas can enter an expansion stage 69 which may include a plurality of heat exchangers 70 followed by a plurality of expanders 72, though embodiments of the invention may include other arrangements including a single heat exchanger and/or expander. The plurality of heat exchangers 70 includes a first frost heat exchanger 74 to cool the flue gas preferably to a temperature where flue gas frosts on the walls of the heat exchanger (e.g., to approximately 200K in some embodiments). FIG. 1 shows the plurality of heat exchangers 70 also including a second frost heat exchanger 76, a third frost heat exchanger 78, and a fourth frost heat exchanger 80 to extract additional CO2 from the flue gas. The pre-frost heat exchanger 68 and each of the plurality of heat exchangers 70 may use ambient pressure, nitrogen-rich flue gas as a coolant. That is, the flue gas is cooled in the plurality of heat exchangers 70 using recuperated nitrogen-rich flue gas from the plurality of expanders 72 to the point where the $CO_2$ begins frosting on the heat exchanger tube walls.

Next, the flue gas is preferably expanded in a plurality of expanders 72 reducing temperature to provide a coolant to each of the plurality of heat exchangers 70. FIG. 1 shows the plurality of expanders 72 as including a first expander 82, second expander 84, third expander 86, and a fourth expander 88. The first expander 82 may reduce the temperature of the flue gas received from the fourth frost heat exchanger 80 to provide a coolant back to the fourth frost heat exchanger 80. The second expander 84 may reduce the temperature of the flue gas received from the first expander 82 after it is warmed in the fourth frost heat exchanger 80 to provide a coolant to the third frost heat exchanger 78, etc. Thus, the expansion stage 69 may include a plurality of heat exchangers 70 coupled in series to extract the solid $CO_2$ from the flue gas, and a plurality of expanders 72 coupled in series and downstream from the plurality of heat exchangers, with each of the heat exchangers coupled to a separate one of the expanders to receive the flue gas as a refrigerant. The process of expansion and reheating occurs for a total of four expansion steps in the expansion stage 69, though any number of suitable expansion steps may occur. After the last expansion step, the nitrogen rich flue stream is sent to cool the second plurality of series connected heat exchangers 46 (e.g., N2 coolers), which preferably warms the nitrogen rich flue stream to near ambient temperatures before its released to the environment.

With regard to operation of the heat exchangers 70 and expansion stage 69, it is noted that—after the flue gas leaves the plurality of heat exchangers 70—enough of the $CO_2$ has been removed such that the $CO_2$ is so diluted in the flue gas that it will have negligible impact on the expansion process. That is, the formation/build-up of solid $CO_2$ during the expansion process performed by expansion stage 69 is avoided by taking nearly all of the $CO_2$ out first in the heat exchangers 70. For example, approximately 97% of the $CO_2$ could be removed from the flue gas by operation of the heat exchangers 70 prior to the flue gas passing to the expansion stage 69.

Formation of solid $CO_2$ on the frost heat exchangers 74, 76, 78, 80, may be removed to use in cooling heat exchangers in the first cooling stage 43 and the second cooling stage 58 prior to sequestration or use in other industrial applications. In order to remove the solid $CO_2$ from the frost heat exchangers 74, 76, 78, 80, one or more of the frost heat exchangers can run a recuperation mode 90 while the others remain online. The recuperation process could involve circulating liquid $CO_2$ (e.g., at approximately 12 bar in some embodiments) through the respective frost heat exchanger to melt solid $CO_2$ from walls of the heat exchanger (described further below).

The liquid $CO_2$ used in the recuperation mode 90 may be stored in a liquid $CO_2$ reservoir 92. The liquid $CO_2$ from the liquid $CO_2$ reservoir 92 is circulated through the respective frost heat exchanger 74, 76, 78, 80, to melt off solid $CO_2$ formed on the walls of the heat exchanger, which is added to the liquid $CO_2$ reservoir 92. The plurality of heat exchangers 70 preferably includes extra capacity sufficient to allow one or more heat exchangers to run the recuperation mode 90 while the others remain online.

The liquid in the liquid $CO_2$ reservoir 92 is also used as a refrigerant in the first cooling stage 43 and the second cooling stage 58. A pump 94 may pump the liquid $CO_2$ from the liquid $CO_2$ reservoir 92 to a first valve 96 that directs some of the liquid $CO_2$ to the heat exchanger in the recuperation mode 90 and directs the rest of the liquid $CO_2$ to the second cooling stage 58. Next, a second valve 98 may be used to direct some of the liquid $CO_2$ to the first heat exchanger 64 and the rest of the liquid $CO_2$ to the second heat exchanger 66. The liquid $CO_2$ from the first heat exchanger 64 and the second heat exchanger 66 are combined at a third valve 100, also referred to as a mixing valve, which directs some of the liquid $CO_2$ back to the liquid $CO_2$ reservoir 92 and the rest to a second pump 102. The second pump 102 pumps liquid $CO_2$ to the first plurality of series connected heat exchangers 44, which can subsequently enter to a $CO_2$ pipeline 104 preferably as a liquid or supercritical fluid for sequestration or other industrial use.

The liquid $CO_2$ that returns to the liquid $CO_2$ reservoir 92 from the second cooling stage 58 can be cooled by the melting energy of the solid $CO_2$ during the recuperation mode 90. Thus, the second cooling stage 58 may include a cooling loop 105 comprising one or more heat exchangers 64, 66 to cool compressed flue gas with liquid $CO_2$, and a liquid $CO_2$ reservoir 92 to cool liquid $CO_2$ expelled from the one or more heat exchangers using solid $CO_2$ (e.g. a $CO_2$ melt).

As stated above, solid $CO_2$ builds upon on the walls of the frost heat exchangers 74, 76, 78, 80, which can reduce flow distribution and heat transfer. To promote even distribution of $CO_2$ buildup, the frost heat exchangers 74, 76, 78, 80 may use a single-pass cross-flow configuration, with short path length tubes of the heat exchanger which contain the desublimating fluid. Further, as $CO_2$ builds up in certain areas, it creates a flow blockage slowing additional buildup of $CO_2$ in those areas, thus promoting even distribution of solid $CO_2$ across the heat exchanger. The shorter path lengths also promote a redistribution of flow and $CO_2$ buildup in the direction of the desublimating fluid since temperature gradients along the tube lengths is limited. Also, large flow area within the heat exchanger tubes allows for longer periods of $CO_2$ buildup before the recuperation mode 90 ($CO_2$ melting) must be performed.

As referred to above, the $CO_2$ separation and liquefaction system 20 removes solid $CO_2$ from the frost heat exchangers 74, 76, 78, 80 periodically to ensure consistent and adequate performance of the heat exchanger and to remove $CO_2$ from the flue stream. As such, the recuperation mode 90 periodically melts the solid $CO_2$ off the walls of the heat exchanger using liquid $CO_2$ from the liquid $CO_2$ reservoir 92. The frost heat exchangers 74, 76, 78, 80 may be grouped into sets of one or more heat exchangers that allow at least one set to be online while the remaining sets are in the recuperation mode 90 (e.g. melting process), and then allow periodic swapping of the different sets in/out of the melting process for continuous operation of the $CO_2$ separation and liquefaction system 20.

A melting process for the frost heat exchangers 74, 76, 78, 80 using the recuperation mode 90 includes a first step of determining whether a predetermined amount of $CO_2$ has formed on the walls of a first set of heat exchangers. The first step continues by operating valve(s) (not shown) to turn on the flow of flue gas to a second set of frost heat exchangers that were previously in the recuperation mode 90, and then operating valve(s) to turn off flow of flue gas to the first set of frost heat exchangers. During the first step, solid $CO_2$ will be formed on the walls of the first set of heat exchangers, which will also contain pressurized flue gas (e.g., at approximately 12 bar in some embodiments).

Step two involves operating valve(s) to turn on liquid CO2 to the first set of heat exchangers, with the liquid CO2 being provided from the first heat exchanger 64, second heat exchanger 66, or the liquid CO2 reservoir 92. The liquid CO2 will push the flue gas out of the first set of frost heat exchangers and into the liquid CO2 reservoir 92 where it can be periodically bled off through a pressure relief valve. The liquid CO2 also strips (i.e., melts) off the solid CO2 from the first set of frost-heat exchanges, absorbing its cooling potential (i.e., cold/melting energy) and transferring it to the liquid CO2 reservoir 92. The mass flow of the liquid CO2 is high enough to prevent additional freezing within the first set of frost heat exchangers.

After the solid CO2 is removed from the first set of heat exchangers in the recuperation mode 90, the process continues at step three where flue gas is pulled into the first set of heat exchangers to displace the liquid CO2. The first set of frost heat exchanger is now cleaned of solid CO2 and is appropriately pressurized with flue gas. The aforementioned valves can be operated to swap out another set of frosting heat exchangers when needed.

Figure 2:
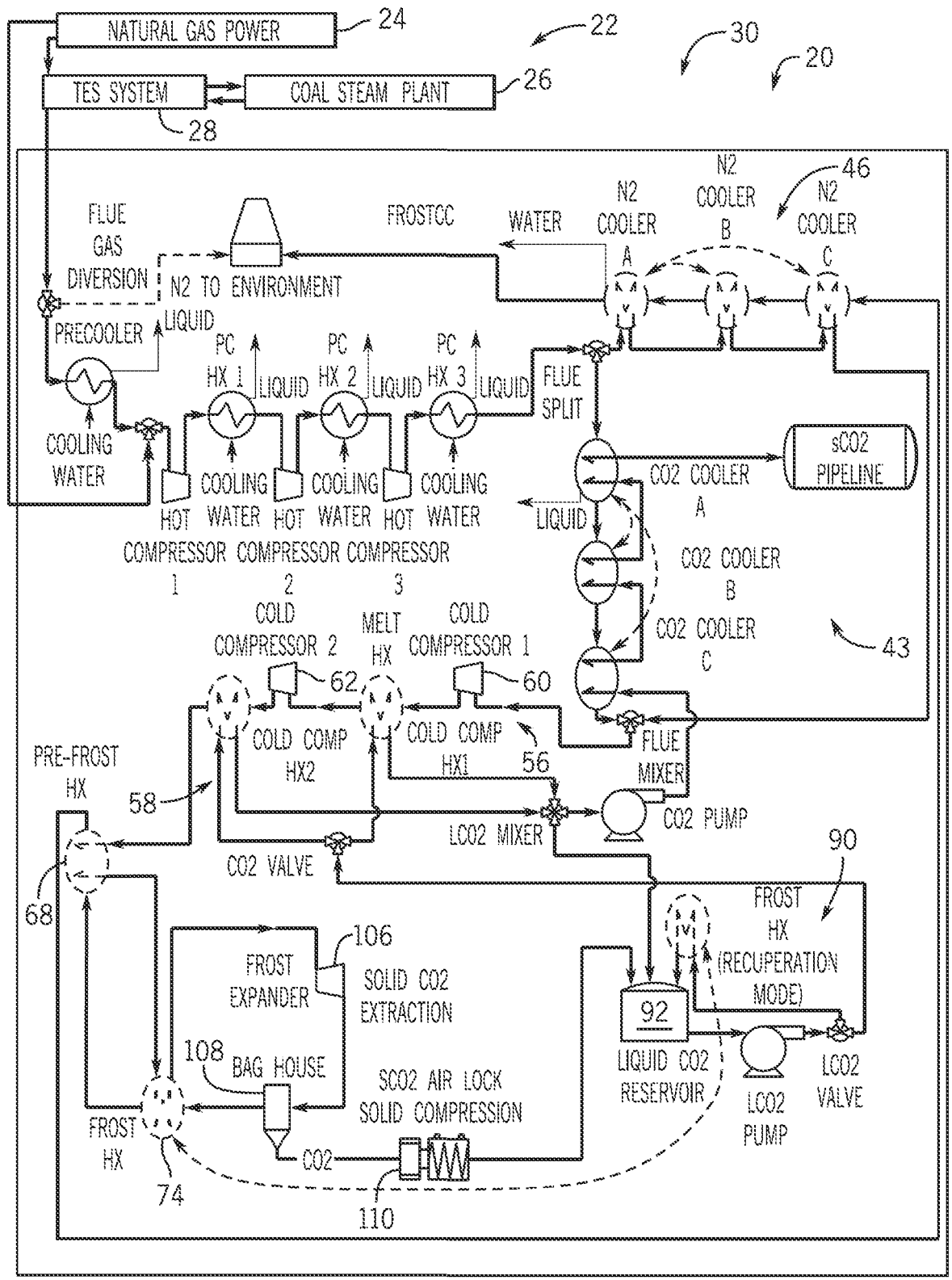
FIG. 2 is a process diagram of a CO2 separation and liquefaction system with frosting expansion coupled to a combined cycle power plant and a thermal energy storage system, according to an embodiment of the invention.

Referring to FIG. 2, a process diagram of a CO2 separation and liquefaction system with frosting expansion is shown, according to an embodiment of the invention. The CO2 separation and liquefaction system 20 is shown coupled to a combined-cycle power plant 22 that includes a natural gas power plant 24, a coal steam plant 26, and a TES system 28 thus providing a CCS system 30 for the combined-cycle power plant 22.

FIG. 2 shows the CCS system 30 including a first cooling stage 43 to cool a flue gas with CO2 to be sequestered, and a compression stage 56 coupled to the first cooling stage to compress the cooled flue gas. A second cooling stage 58 may be coupled to the compression stage 56 to cool the compressed flue gas with solid CO2, and an expander 106, also referred to as a frost expander, may be coupled to the second cooling stage to extract solid CO2 from the flue gas. The expander 106 is preferably coupled to the first cooling stage 43 and the second cooling stage 58 to provide the solid CO2 and the CO2 to be sequestered. The embodiment of FIG. 2 shares many elements with the embodiment of FIG. 1, and discussion of these elements are found with respect to FIG. 1.

In the embodiment of FIG. 2, after the flue gas is cooled in the pre-frost heat exchanger 68, the flue stream is further cooled in the first frost heat exchanger 74 to the point where the CO2 begins frosting on the walls of the first frost heat exchanger 74. The flue gas then enters the expander 106 and is preferably expanded to near atmospheric pressure. During the expansion process, more CO2 will solidify (i.e., frost), which can be filtered from the flue gas using a solid CO2 filter 108, also referred to as a bag house. The solid CO2 may then be pressurized and pressed into the liquid CO2 reservoir 92 using an air lock 110, which may include a solid compressor. The solid CO2 pressed into the liquid CO2 reservoir 92 cools liquid CO2 received from the second cooling stage 58, thus recover its melting energy.

Upon removal of CO2 in the frost expander 106, the flue gas may reach the point where only 3% of the original CO2, in this embodiment, remains in vapor form. The remaining nitrogen-rich flue stream may then be used as a refrigerant in the first frost heat exchanger 74, the pre-frost heat exchanger 68, and then the second plurality of series connected heat exchangers 46, before being discharged to the atmosphere. The first frost heat exchanger 74 may be periodically swapped with a replacement so that it can enter the recuperation mode 90, as discussed above with respect to FIG. 1. Extra capacity, in the form of additional frost heat exchangers, allows for the first frost heat exchanger 74 to enter the recuperation mode 90 without turning offline the CO2 separation and liquefaction system 20.

The frost expander 106 may comprise an expansion turbine to produce work used to drive a compressor or generator, and can reduce heat transfer area over that of heat exchangers, thereby reducing capital costs. It is recognized that drawbacks of inclusion of the expander 106 may include solid CO2 buildup, erosion from solid CO2 particles, high subcooling requirements in order to nucleate the CO2, and maintaining high efficiency, but that such drawbacks can be mitigated.

Solid CO2 buildup on the walls of the expander 106 can clog the expander or lead to balance issues with turbine blades. CO2 buildup can occur through two main mechanisms: heterogeneous nucleation as the CO2 cools during expansion, and sticking to the expander upon impingement as CO2 particles flow through the expander. Both of these issues may be overcome by heating the turbine wall or using microchannels to provide an inert gas along the walls for protection. Additionally, special coatings may be used to increase the activation energy of heterogeneous nucleation on the walls and/or prevent sticking of impinged solid CO2.

Additionally, impacts from solid CO2 particles against the expander 106 can cause erosion. Turbine blade erosion can be minimized by employing three different strategies. First, erosion can be reduced by coating the rotor blades with a high Vickers hardness coating including WC-10Co-4Cr Tungsten Carbide Cobalt Chrome. Such coatings have high resistance to erosion and are commonly used to protect slurry pumps and turbine blades from erosion. Second, erosion can be reduced by minimizing impact pressure below the impacted material yield strength, accomplished by reducing impact velocity. Third, erosion can be minimized by reducing particle impact angle, since the highest impact force generally occurs when the impact angle is 90° to an impact surface.

CO2 nucleation from the flue gas in the expander 106 may require increasing subcooling of the CO2. However, increased subcooling requirements can reduce efficiency of the CO2 separation and liquefaction system 20 by requiring large over-pressurization of the flue gas to drive the nucleation. A default strategy includes seeding the flue gas at the inlet of the expander 106 with either liquid CO2 spray, a non-CO2 liquid contact fluid spray, solid CO2 dust, or non-CO2 dust particles.

With regard to the CCS system 30, a CCS system 30 has been simulated in ChemCAD software using flue gas from an NETL Case B31A natural gas combined cycle power plant. Capital cost estimations were performed using a ground-up design process to account for all materials and fabrication steps. Table 1 below shows the key performance parameters associated with the CCS system 30. With over 97% capture efficiency, the cost to capture CO2 is only $29/tonne. This cost accounts for the installed capital cost, electricity consumed, operation and maintenance costs, and lost capacity of a power plant. Table 2 gives the key assumptions used to get the CCS system 30 performance parameters. A relatively low electricity price of $29/MWh is possible since the CCS system 30 can be installed at legacy power plants to leverage their low costs of energy. A capacity factor of 90% was assumed since the CCS system 30 will be producing a commodity of nearly pure CO2, which can be sold for revenue. The commodity factor coupled with the performance and maintenance cost advantages of running the power plant at baseload lead to such a high capacity factor assumption.

TABLE 1

CCS System key performance parameters for a natural gas combined cycle power plant.

| | | |
|---|---|---|
| Total $/tonne of captured CO2 (no TS&M) | [$/tonne] | $29 |
| Capital cost | [$/tonne] | $7.3 |
| Energy penalty | [$/tonne] | $15 |
| Capacity loss | [$/tonne] | $3.1 |
| O&M | [$/tonne] | $3.6 |
| Energy penalty | [kWh/t] | 517 |
| Relative natural gas combined cycle power reduction due to CCS | | 22% |
| CO2 capture % | | 97% |

TABLE 2

CCS System key assumptions.

| | | |
|---|---|---|
| Average electricity price for energy | [$/MW11] | $29.00 |
| Power plant capacity payment | [$/kW/yr] | $50.00 |
| Power plant capacity factor | | 0.9 |

The cost energy penalty at a natural gas combined cycle power plant for the CCS system 30 may be about 0.517 MWh/tonne (or for example less than 0.525 or 0.550 MWh/tonne), which at a state of the art new natural gas combined cycle power plant leads to 22% lost energy production.

Benefits of the CCS system 30 include a simple, low-risk system using vapor compression, expansion, and heat exchange, with the ultimate benefit being a low capital cost CCS system. For such a low capital cost, the energy penalty is within an acceptable range. The cold compressor technique (e.g., using first compressor 60 and second compressor 62) is more efficient than if the CCS system were to use only hot compression, thereby reducing energy input required to operate the CCS system 30.

Figure 3:
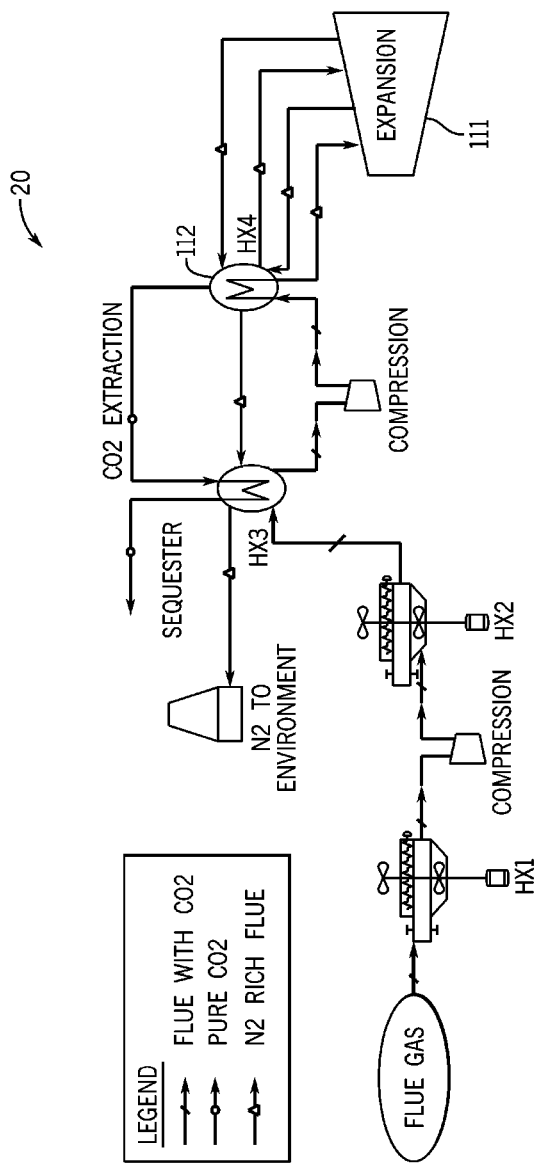
FIG. 3 is a process diagram of a CO2 separation and liquefaction system with interwarming expansion, according to an embodiment of the invention.

Referring to FIG. 3, a simplified process diagram for CO2 separation and liquefaction with interwarming expansion is shown, such as would be carried out by the CO2 separation and liquefaction system of FIG. 1, according to an embodiment of the invention. The CO2 separation and liquefaction process can avoid any substantial desublimation of CO2 during expansion (e.g., to prevent erosion and clogging of the expander). The CO2 separation and liquefaction process prevents frosting in the expander 111 by forcing the frosting to occur in one or more recuperating cold heat exchangers 112 and performing an inter-stage warming process during expansion. The inter-stage process involves expanding some flue gas and sending the expanded cooled flue gas back to a recuperating cold heat exchanger 112 (which warms the flue gas), then expanding the gas further, returning it to the heat exchanger(s) for further warming and pre-cooling of incoming flue gas before expansion.

Figure 4:
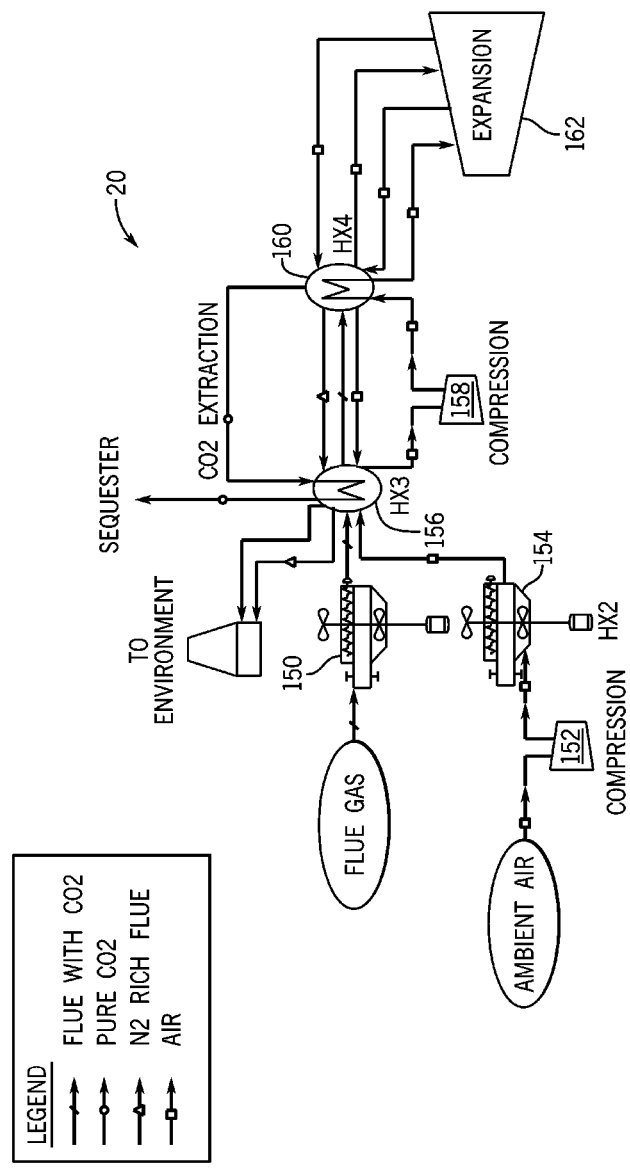
FIG. 4 is a process diagram for a CO2 separation and liquefaction system with air Brayton cooling, according to an embodiment of the invention.

Referring to FIG. 4, a simplified process diagram for CO2 separation and liquefaction using an air Brayton cooling cycle is shown, in accordance with an embodiment of the invention. The air Brayton cooling cycle preferably uses interwarming expansion with air as the working fluid, in contrast to flue gas as a working fluid like the interwarming expansion process of FIG. 3. Referring back to FIG. 4, the air Brayton cooling cycle decouples the flue gas from an expansion cooling step.

The CO2 separation and liquefaction system 20 may receive and cool flue gas at a first heat exchanger 150, preferably cooled by the ambient environment. The system may also receive and compress air from the ambient environment at a first compressor 152. Air from the first compressor 152 may be cooled in a second heat exchanger 154, preferably cooled by the ambient environment. The flue gas from the first heat exchanger 150 and the air from the second heat exchanger 154 are cooled in a first cooling stage 156 using liquid CO2, cold nitrogen-rich flue gas, and cold air. Air from the first cooling stage 156 is compressed in a second compressor 158 and then cooled in a second cooling stage 160. The second cooling stage 160 operates with an expander 162 to perform an inter-stage warming process during expansion, as discussed in more detail previously with respect to FIG. 3 (and FIG. 1).

Referring back to FIG. 4, flue gas from the first cooling stage 156 is further cooled in the second cooling stage 160 to extract solid or liquid CO2, with the flue gas in the second cooling stage 160 cooled by the expanded air. The cooling potential of the extracted solid or liquid CO2 is recovered in a cooling loop that provides liquid CO2 as a refrigerant to the first cooling stage 156, but could recover cooling potential within the second cooling stage 160. After the CO2 extraction, the nitrogen-rich flue stream and the air from the second cooling stage 160 is also used as a refrigerant to the first cooling stage 156. After the first cooling stage 156, the air and the nitrogen-rich flue stream can be vented to the atmosphere, and the extracted CO2 can be used in industrial processes or sequestered.

Accordingly, the flue gas can be cooled using the cooling potential created by expanded air, rather than by expanding the flue gas and using the flue gas as the only refrigerant source. Further, either of the first or second cooling stages 156, 160 may comprise one or more heat exchangers. Since the flue gas is decoupled from the expansion step, either pressurized or unpressurized flue gas can be cooled in the CO2 separation and liquefaction system 20. A system with pressurized flue gas could include compressors or expanders for the flue gas in addition to the compressors and expanders shown in FIG. 4.

Further, the second cooling stage 160 may comprise a thermal energy storage device that stores cooling potential from the expanded air. If the second cooling stage 160 comprises a thermal energy storage device, the air Brayton cooling cycle could be operated on an independent schedule from that of the flue gas, with the cooling potential of the expanded air stored for later use when the flue gas is available. Thus, the flue gas could be chilled to extract solid or liquid CO2 when the air Brayton cycle is not in operation. For example, the thermal energy storage device could store cooling potential from the air Brayton cycle when electricity prices are low and cycle operation is less expensive, and then use the stored cooling capacity when needed during periods of high electricity prices.

Figure 5:
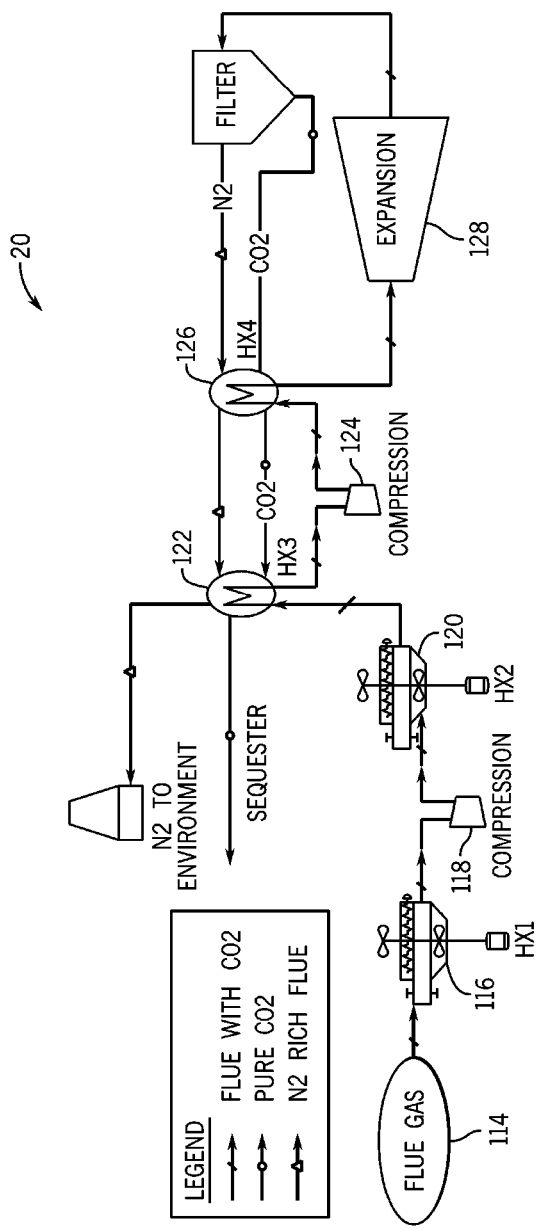
FIG. 5 is a process diagram of a CO2 separation and liquefaction system with frosting expansion, according to an embodiment of the invention.

Referring to FIG. 5 a simplified process diagram for CO2 separation and liquefaction with frosting expansion is shown, such as would be carried out by the CO2 separation and liquefaction system of FIG. 2, according to an embodiment of the invention. The CO2 separation and liquefaction process may include extracting flue gas from a flue gas producer 114 and cooling the flue gas from the flue gas producer in a first heat exchanger 116 cooled by the ambient environment. The flue gas may then be compressed by a first compressor 118 and cooled by a second heat exchanger 120 cooled by the ambient environment. The CO2 separation and liquefaction process may include cooling a first stream of the flue gas from the second heat exchanger 120 using liquid CO2 in a third heat exchanger 122 and compressing the flue gas in a second compressor 124. The process may also include cooling the flue gas in a fourth heat exchanger 126 by melting solid $CO_2$ and producing the liquid $CO_2$, and expanding the flue gas in one or more expanders 128 to extract the solid $CO_2$. Either of the first heat exchanger 116 and the second heat exchanger 120 could be a water-cooled heat exchanger cooled by water from the ambient environment.

The $CO_2$ separation and liquefaction process may further include cooling the flue gas in a pre-frost heat exchanger 68 (FIG. 1) and a first frost heat exchanger 74 (FIG. 1) after cooling the flue gas in the fourth heat exchanger 126 by melting solid $CO_2$ and producing the liquid $CO_2$. The process may also include swapping the first frost heat exchanger 74 (FIG. 1) with a second frost heat exchanger to continue cooling the flue gas, and running liquid $CO_2$ through the first frost heat exchanger to melt the solid $CO_2$.

Referring to FIG. 6, a graph of simulated $CO_2$ buildup up on the walls of a heat exchanger (e.g., any of frost heat exchangers 74, 76, 78, 80) used in a $CO_2$ separation and liquefaction system is shown, in accordance with an embodiment of the invention. That is, FIG. 6 is a graph of solid $CO_2$ thickness build up in inches on heat exchanger tube walls, each having a 2 inch diameter, along the length of different rows 180, 182, 184, 186, 188 of tubes at 4.2362 hours into the simulation. As can be seen, the heat exchanger design was able to achieve a relatively even distribution of solid $CO_2$ buildup.

Beneficially, embodiments of the invention thus provide a $CO_2$ separation and liquefaction system that may be used to improve carbon capture and sequestration. In addition, new and novel processes and techniques for implementing a carbon capture and sequestration (CCS) system are disclosed. The CCS system can use flue gas as the only refrigerant, with compression split up into a warm component and a cold component. After the warm compression, flue gas may be cooled by the ambient environment and then cooled using recirculated flue gas and liquid $CO_2$. After cold compression, the flue gas may be cooled by liquid $CO_2$ that has been cooled by recovering melting energy of solid $CO_2$. The CCS system also exhibits substantial cost advantages as a result of lower capital costs and improved efficiency.

Therefore, according to one embodiment of the invention, a $CO_2$ separation and liquefaction system includes a first cooling stage to cool flue gas with liquid $CO_2$, a compression stage coupled to the first cooling stage to compress the cooled flue gas, a second cooling stage coupled to the compression stage and the first cooling stage to cool the compressed flue gas with a $CO_2$ melt and provide the liquid $CO_2$ to the first cooling stage, and an expansion stage coupled to the second cooling stage to extract solid $CO_2$ from the flue gas that melts in the second cooling stage to provide the liquid $CO_2$.

According to another embodiment of the invention, a carbon capture and sequestration (CCS) system includes a first cooling stage to cool a flue gas with $CO_2$ to be sequestered, a compression stage coupled to the first cooling stage to compress the cooled flue gas, a second cooling stage coupled to the compression stage to cool the compressed flue gas with solid $CO_2$, and an expander coupled to the second cooling stage to extract solid $CO_2$ from the flue gas, the expander coupled to the first cooling stage and the second cooling stage to provide the solid $CO_2$ and the $CO_2$ to be sequestered.

According to yet another embodiment of the invention, a method of operating a $CO_2$ liquefaction system includes extracting flue gas from a flue gas producer, compressing the flue gas in a first compressor, cooling the flue gas in a heat exchanger cooled by the ambient environment, cooling a first stream of the flue gas from the heat exchanger using liquid $CO_2$, compressing the flue gas in a second compressor, cooling the flue gas by melting solid $CO_2$ and producing the liquid $CO_2$, and expanding the flue gas to extract the solid $CO_2$.

According to still another embodiment of the invention, a CCS system for a power plant includes a first compressor to compress air and a first heat exchanger coupled to the first compressor to cool the compressed air, the first heat exchanger cooled by an ambient environment. The CCS system also includes a first cooling stage coupled to the power plant to receive flue gas and coupled to the first heat exchanger to receive the air, the first cooling stage cooling the flue gas and the air with liquid $CO_2$. The CCS system further includes a second compressor coupled to the first cooling stage to receive and compress the air, a second cooling stage coupled to the second compressor to receive and cool the air, the second cooling stage coupled to the first cooling stage to cool and extract $CO_2$ from the flue gas and provide the liquid $CO_2$, and an expansion stage coupled to the second cooling stage to expand the air and provide the expanded air to the second cooling stage to cool the flue gas.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A $CO_2$ separation and liquefaction system comprising:
    a first cooling stage for cooling $CO_2$-containing gas, the first cooling stage comprising:
    a first gas path comprising at least a first heat exchanger configured to cool a first portion of the $CO_2$-containing gas using a first portion of liquid $CO_2$ as a coolant; and
    a second gas path coupled in parallel with the first gas path, the second gas path comprising at least a second heat exchanger configured to cool a second portion of the $CO_2$-containing gas using a N2-rich stream of gas as a coolant;
    wherein the first cooling stage outputs a first cooled gas;
    a compression stage configured to compress the first cooled gas output by the first cooling stage in at least one compressor to output a compressed gas;
    a second cooling stage comprising: at least a third heat exchanger configured to use a second portion of the liquid $CO_2$ as a coolant to cool the compressed gas; and
    wherein the second cooling stage is configured to receive the second portion of the liquid $CO_2$ from a $CO_2$ reservoir, to direct the second portion of the liquid $CO_2$ to the first heat exchanger to form at least a part of the first portion of the liquid $CO_2$;
    and to output a second cooled gas;
    an expansion stage comprising at least a frost heat exchanger, the expansion stage configured to:
    form the N2 rich stream of gas by extracting solid $CO_2$ from the second cooled gas output by the second cooling stage;

receive a third portion of the liquid CO2 from the CO2 reservoir in the at least one frost heat exchanger to melt at least a portion of the solid CO2 to produce melted CO2;

provide the melted CO2 to the CO2 reservoir; and direct the N2-rich stream of gas output by the at least one frost heat exchanger:

through at least one expander to cool the N2-rich stream of gas;

from the at least one expander to the at least one frost heat exchanger for use as a coolant; and from the at least one frost heat exchanger to the second heat exchanger in the second gas path.

2. The CO2 separation and liquefaction system of claim 1, further comprising:

a split for separating the CO2-containing gas into the first and second portions and directing the first and second portions to the first and second gas paths, respectively; and a mixer for combining the first and second gas portions into the first cooled gas for entry into the compression stage.

3. The CO2 separation and liquefaction system of claim 1 wherein the first gas path of the first cooling stage comprises:

a fourth heat exchanger connected in series with the first heat exchanger; and a fifth heat exchanger connected in series with the fourth heat exchanger.

4. The CO2 separation and liquefaction system of claim 3 wherein at least a portion of the first cooling stage is configured to remove water via recuperative cooling using a portion of the liquid CO2 as a coolant and wherein:

the first heat exchanger is configured to cool the first portion of the CO2-containing gas to a first temperature;

the fourth heat exchanger is configured to cool the first portion of the CO2-containing gas to a second temperature lower than the first temperature; and the fifth heat exchanger is configured to cool the first portion of the CO2-containing gas to a third temperature lower than the second temperature.

5. The CO2 separation and liquefaction system of claim 4 wherein the fifth heat exchanger is configured to cool the first portion of the CO2-containing gas to a temperature of 220K.

6. The CO2 separation and liquefaction system of claim 1 wherein the compression stage comprises:

a first compressor;

at least a second compressor; and a sixth heat exchanger connected in series with and between the first and second compressors of the compression stage.

7. A method of operating a CO2 separation and liquefaction system, the method comprising:

cooling a CO2 containing gas in a first cooling stage by cooling a first portion of the CO2-containing gas in a first gas path, the first gas path comprising a first heat exchanger that utilizes a first portion of a liquid CO2 as a coolant;

cooling a second portion of the CO2-containing gas in a second gas path, the second gas path comprising a second heat exchanger that utilizes an N2 rich stream as a coolant;

combining the first and second portions of the CO2-containing gas after cooling in the first and second gas paths, respectively, to output a first cooled gas;

compressing the first cooled gas output by the first cooling stage in a compression stage comprising at least one compressor to output a compressed gas;

cooling the compressed gas output by the compression stage in a second cooling stage comprising at least one heat exchanger using a second portion of liquid CO2 received from a CO2 reservoir as a coolant to output a second cooled gas;

extracting solid CO2 from the second cooled gas output by the second cooling stage in an expansion stage comprising at least one frost heat exchanger configured to extract CO2 from the cooled gas output by the second cooling stage to form the N2 rich stream, cooling the N2 rich stream output by the at least one frost heat exchanger in at least one expander of the expansion stage;

supplying the N2 rich stream from the at least one expander to the at least one frost heat exchanger for use as a coolant;

supplying the N2 rich stream from the at least one frost heat exchanger to the second heat exchanger of the second gas path of the first cooling stage for use as a coolant;

supplying a third portion of the liquid CO2 from the CO2 reservoir to the at least one frost heat exchanger of the expansion stage to melt at least a portion of the solid CO2 into a melted CO2; and providing the melted CO2 to the CO2 reservoir;

wherein the first portion of the liquid CO2 comprises at least a part of the $2^{nd}$ portion of the liquid CO2.

8. The method of claim 7 wherein the supplying the second portion of the liquid CO2 from the CO2 reservoir to the at least one frost heat exchanger further comprises: determining whether a predetermined amount of the solid CO2 has formed within the at least one frost heat exchanger; if the solid CO2 formed within the at least one frost heat exchanger is equal to or greater than the predetermined amount of the solid CO2, operating at least one first valve to prevent the gas output by the second cooling stage from entering the at least one first frost heat exchanger; and operating at least one second valve to turn on a flow of the liquid CO2 to the at least one frost heat exchanger.

9. The method of claim 7 further comprising:

cooling the CO2-containing gas in a precooler to condense out water and acid from the CO2-containing gas to produce a residual gas;

compressing the residual gas output by the precooler in at least one hot compressor;

cooling a compressed gas output by the at least one hot compressor in at least one post-compression heat exchanger; and directing a cooled gas output by the at least one post-compression heat-exchanger to the first cooling stage.

10. The CO2 separation and liquefaction system of claim 1, wherein the second gas path of the first cooling stage comprises:

a seventh heat exchanger connected in series with the second heat exchanger; and an eighth heat exchanger connected in series with the seventh heat exchanger.

11. The CO2 separation and liquefaction system of claim 10, wherein at least a portion of the second cooling stage is configured to remove water via recuperative cooling using a portion of the N2 rich gas as a coolant and wherein:

the second heat exchanger is configured to cool the second portion of the CO2-containing gas to a fourth temperature;

the seventh heat exchanger is configured to cool the second portion of the $CO_2$-containing gas to a fifth temperature lower than the fourth temperature; and the eighth heat exchanger is configured to cool the second portion of the $CO_2$-containing gas to a sixth temperature lower than the fifth temperature.

12. The $CO_2$ separation and liquefaction system of claim 11, wherein the eighth heat exchanger is configured to cool the second portion of the $CO_2$-containing gas to a temperature of 220K.

* * * * *